United States Patent
Chang (10) Patent No.: US 9,256,023 B2
(45) Date of Patent: Feb. 9, 2016

(54) BACKLIGHT MODULE AND LIQUID CRYSTAL DISPLAY DEVICE USING SAME

(71) Applicant: Shenzhen China Star Optoelectronics Technology Co., Ltd., Shenzhen, Guangdong (CN)

(72) Inventor: Jianyu Chang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 115 days.

(21) Appl. No.: 14/356,374

(22) PCT Filed: Mar. 25, 2014

(86) PCT No.: PCT/CN2014/074005
§ 371 (c)(1),
(2) Date: May 5, 2014

(87) PCT Pub. No.: WO2015/135228
PCT Pub. Date: Sep. 17, 2015

(65) Prior Publication Data
US 2015/0301272 A1 Oct. 22, 2015

(30) Foreign Application Priority Data
Mar. 10, 2014 (CN) .......................... 2014 1 0086564

(51) Int. Cl.
*G02F 1/1333* (2006.01)
*F21V 8/00* (2006.01)
*G02B 6/00* (2006.01)

(52) U.S. Cl.
CPC ................ *G02B 6/0088* (2013.01); *G02B 6/00* (2013.01); *G02B 6/005* (2013.01); *G02F 1/133308* (2013.01); *G02F 2001/13332* (2013.01);*G02F2001/133317* (2013.01); *G02F 2201/08* (2013.01); *G02F 2201/503* (2013.01)

(58) Field of Classification Search
CPC ........ G02B 6/005; G02B 6/0088; G02B 6/00; G02F 1/133308
See application file for complete search history.

(56) References Cited

U.S. PATENT DOCUMENTS

2007/0212007 A1* 9/2007 Chou .................... G02B 6/0088
385/120
2012/0287355 A1* 11/2012 Oya ..................... G02B 6/0031
348/790

(Continued)

*Primary Examiner* — James Dudek
(74) *Attorney, Agent, or Firm* — Andrew C. Cheng (57) ABSTRACT

The present invention provides a backlight module and a liquid crystal display device using the backlight module. The backlight module includes a backplane (2), a light guide plate (4) arranged in the backplane (2), a backlight source (6) arranged in the backplane (2) at one side of the light guide plate (4), a light shielding film (8) mounted on the light guide plate (4) and the backplane (2) and located above the backlight source (6), and an optic film assembly (10) arranged on the light shielding film (8) and the light guide plate (4). The light shielding film (8) has an end fixedly connected to an upper surface of the light guide plate (4) and an opposite end fixedly connected to the backplane (2). The present invention provides an arrangement of a light shielding film above the backlight source to effectively prevent light leaking and enhance the optic quality of the backlight module. Further, a light shielding section of the light shielding film is arranged to be extendable so as to effectively prevent shifting of the light shielding film resulting from an external force acting thereon during the transportation thereof thereby further effectively preventing the occurrence of light leaking and being helpful for bezel slimming of the liquid crystal display device.

13 Claims, 6 Drawing Sheets

(56) References Cited

U.S. PATENT DOCUMENTS

2013/0114018 A1* 5/2013 Kim .................. G02F 1/133308 349/58

2013/0242226 A1* 9/2013 Jeong .................... G06F 1/1637 349/58

2014/0369067 A1* 12/2014 Chen .................... G02B 6/0021 362/606

* cited by examiner

BACKLIGHT MODULE AND LIQUID CRYSTAL DISPLAY DEVICE USING SAME

BACKGROUND OF THE INVENTION

1. Field of the Invention

The present invention relates to the field of flat panel displaying, and in particular to a backlight module and a liquid crystal display device using the backlight module.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module to generate images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Figure 1:
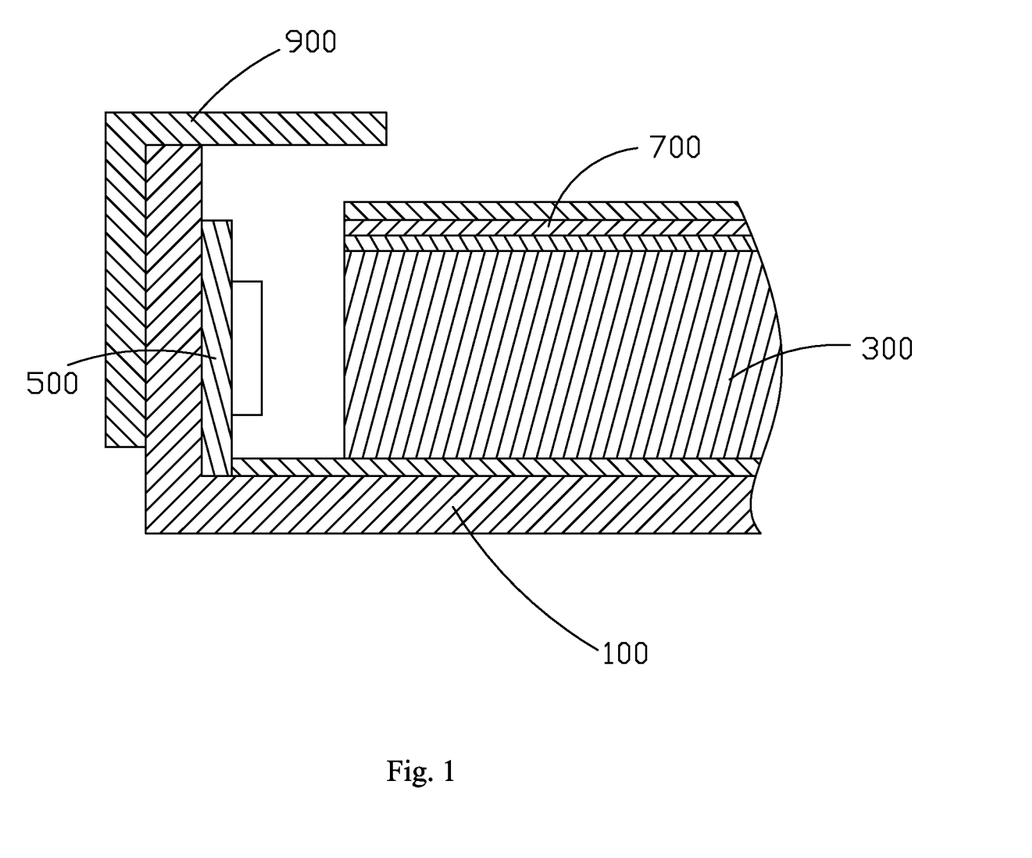
FIG. 1 is a schematic view showing an essential structure of a conventional side-edge backlight module.

Referring to FIG. 1, which is a schematic view showing an essential structure of a conventional side-edge backlight module, which comprises: a backplane 100, a light guide plate 300 that is arranged in the backplane 100 and a backlight source 500 that is arranged in the backplane 100 and located at one side of the light guide plate 300, an optic film assembly 700 arranged on the light guide plate 300, and a mold frame 900 that is arranged on the backplane 100.

Figure 2:
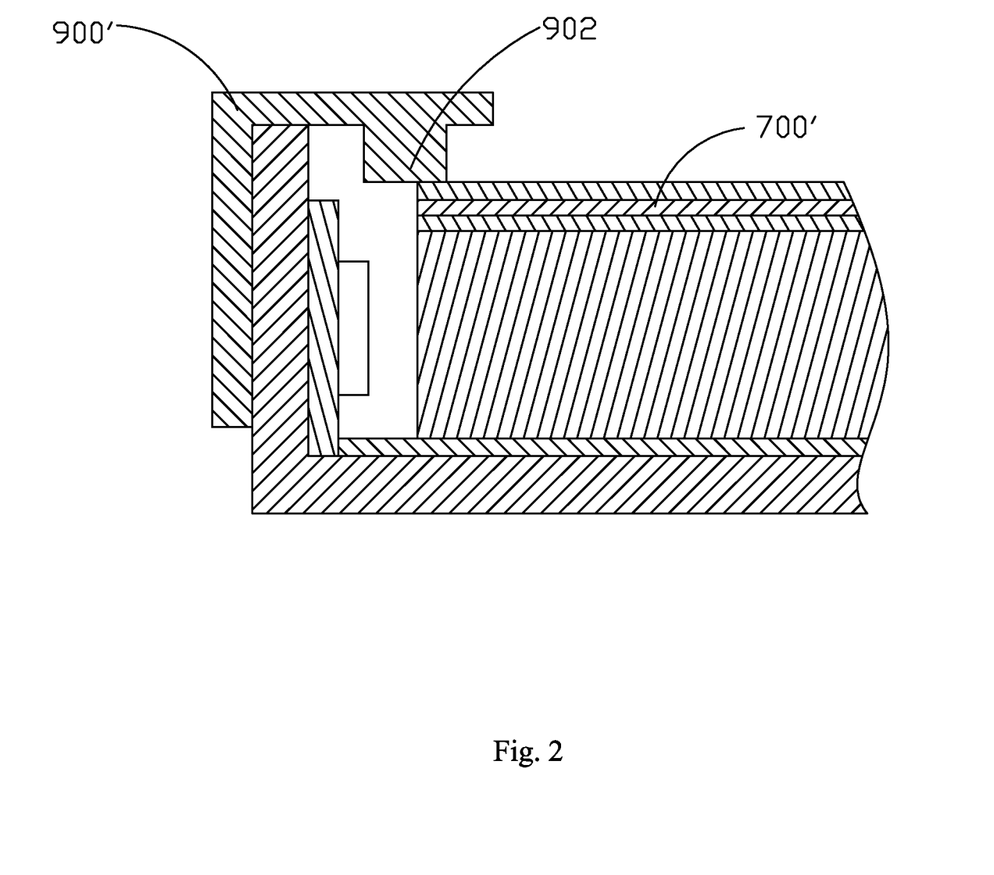
FIG. 2 is a cross-sectional view showing a structure of a conventional backlight module.

However, the backlight module 1 shown in FIG. 1 is readily susceptible to light leaking (which means light emitting from the backlight source 500 is transmitted out directly through the optic film assembly 700). To cope with such a problem, a backlight module (as shown in FIG. 2) having a barrier wall 902 formed n the mold frame 900' is available to reflect back the leaking light.

Figure 3:
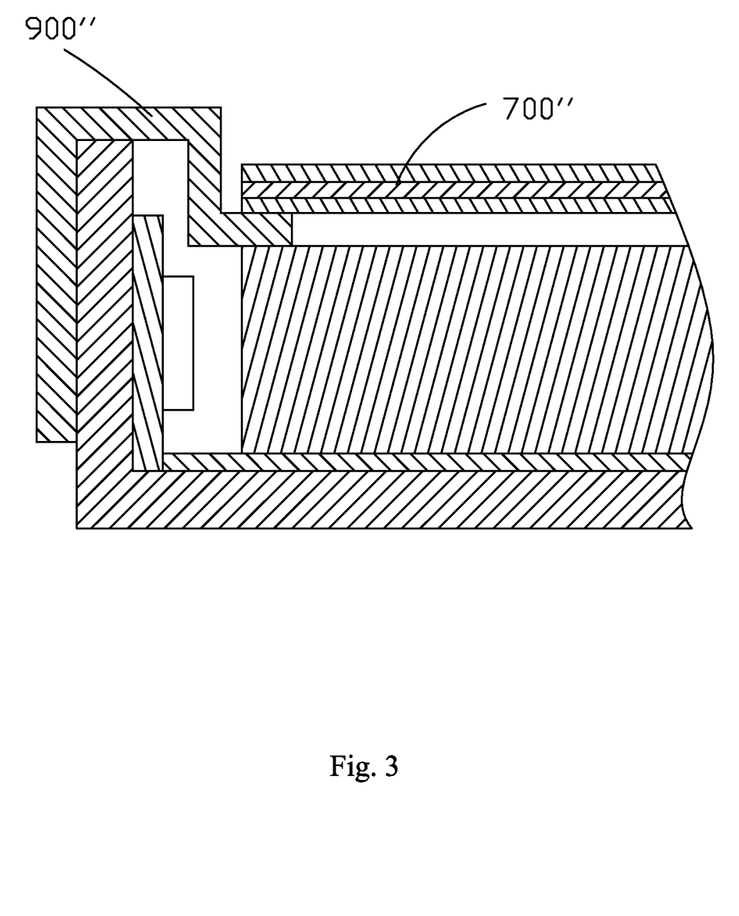
FIG. 3 is a cross-sectional view showing a structure of a conventional backlight module.

With the development of the LCD industry, consumers' request for LED bezel is increasingly heightened. For the arrangement of side-edge lighting illustrated in FIG. 2, due to the limitation imposed by the barrier wall 902 of the mold frame 900', it is generally difficult to achieve bezel slimming. For the purposes of achieving bezel slimming, the solution illustrated in FIG. 3 is commonly adopted, in which the optical film assembly 700'' are positioned on the mold frame 900''. Such an arrangement enables the achievement of narrowing of the bezel but also brings other issues. For example, the optic film assembly 700'' may readily get separated, making it difficult to fix.

Figure 4:
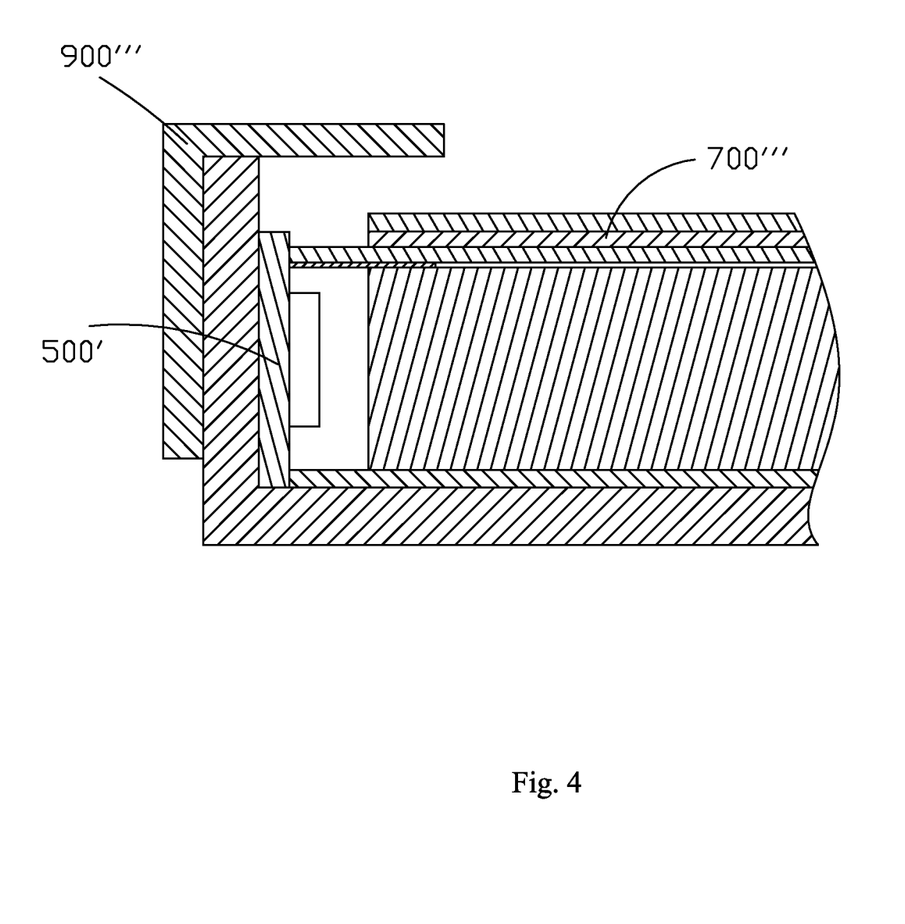
FIG. 4 is a cross-sectional view showing a structure of a conventional backlight module.

Other arrangements is also known, such as positioning the optic film assembly 700''' under the mold frame 900''' (as shown in FIG. 4). To prevent light leaking, the lowermost one of the films of the optic film assembly 700''' is extended in the light incidence side to a surface of a printed circuit board (PCB) of the backlight source 500' and a circumference of the lowermost film or even all the films is blacked. This increases the operations of processing the optic film assembly 700''' and a lower yield rate may result, leading to an increase of the cost.

SUMMARY OF THE INVENTION

An object of the present invention is to provide a backlight module that has a simple structure and effectively prevents the occurrence of light leaking.

Another object of the present invention is to provide a liquid crystal display device, which has a simple structure and is helpful for bezel slimming.

To achieve the above objects, the present invention provides a backlight module, which comprises: a backplane, a light guide plate arranged in the backplane, a backlight source arranged in the backplane at one side of the light guide plate, a light shielding film mounted on the light guide plate and the backplane and located above the backlight source, and an optic film assembly arranged on the light shielding film and the light guide plate. The light shielding film has one end fixedly connected to an upper surface of the light guide plate and an opposite end fixedly connected to the backplane.

The backplane comprises a bottom board and a side board perpendicularly connected to the bottom board. The backlight source is fixedly mounted to the side board. The opposite end of the light shielding film is fixedly connected to the side board of the backplane.

The light shielding film comprises a first connection section, a light shielding section connected to the first connection section, and a second connection section connected to the light shielding section. The first connection section is fixedly connected to an upper end of the side board of the backplane. The light shielding section is located above the backlight source. The second connection section is fixedly connected to the upper surface of the light guide plate.

The first connection section is fixedly connected to the upper end of the side board of the backplane through adhesive bonding and the second connection section is fixedly connected to the upper surface of the light guide plate through adhesive bonding.

The light shielding section is extendable.

The light shielding section is in the form of a folded configuration.

The backlight module further comprises a bottom reflector plate arranged between the backplane and the light guide plate and a mold frame mounted on the backplane. The first connection section is located between the mold frame and the upper end of the side board of the backplane.

The present invention further provides a backlight module, which comprises: a backplane, a light guide plate arranged in the backplane, a backlight source arranged in the backplane at one side of the light guide plate, a light shielding film mounted on the light guide plate and the backplane and located above the backlight source, and an optic film assembly arranged on the light shielding film and the light guide plate, the light shielding film having one end fixedly connected to an upper surface of the light guide plate and an opposite end fixedly connected to the backplane;

wherein the backplane comprises a bottom board and a side board perpendicularly connected to the bottom board, the backlight source being fixedly mounted to the side board, the opposite end of the light shielding film being fixedly connected to the side board of the backplane; and wherein the light shielding film comprises a first connection section, a light shielding section connected to the first connection section, and a second connection section connected to the light shielding section, the first connection section being fixedly connected to an upper end of the side board of the backplane, the light shielding section being located above the backlight source, the second connection section being fixedly connected to the upper surface of the light guide plate.

The first connection section is fixedly connected to the upper end of the side board of the backplane through adhesive bonding and the second connection section is fixedly connected to the upper surface of the light guide plate through adhesive bonding.

The light shielding section is extendable.

The light shielding section is in the form of a folded configuration.

The backlight module further comprises a bottom reflector plate arranged between the backplane and the light guide plate and a mold frame mounted on the backplane. The first connection section is located between the mold frame and the upper end of the side board of the backplane.

The present invention further provides a liquid crystal display device, which comprises: a backlight module, a liquid crystal display panel arranged on the backlight module, and a bezel arranged on the liquid crystal display panel. The backlight module comprises a backplane, a light guide plate arranged in the backplane, a backlight source arranged in the backplane at one side of the light guide plate, a light shielding film mounted on the light guide plate and the backplane and located above the backlight source, and an optic film assembly arranged on the light shielding film and the light guide plate. The light shielding film has one end fixedly connected to an upper surface of the light guide plate and an opposite end fixedly connected to the backplane.

The backplane comprises a bottom board and a side board perpendicularly connected to the bottom board. The backlight source is fixedly mounted to the side board. The light shielding film comprises a first connection section, a light shielding section connected to the first connection section, and a second connection section connected to the light shielding section. The first connection section is fixedly connected to an upper end of the side board of the backplane through adhesive bonding. The light shielding section is made in the form of a folded configuration arranged above the backlight source. The second connection section is fixedly connected to the upper surface of the light guide plate through adhesive bonding.

The backlight module further comprises a bottom reflector plate arranged between the backplane and the light guide plate and a mold frame mounted on the backplane. The first connection section is located between the mold frame and the upper end of the side board of the backplane.

The efficacy of the present invention is that the present invention provides a backlight module and a liquid crystal display device using the backlight module, in which a light shielding film arranged above the backlight source to effectively prevent light leaking and enhance the optical quality of the backlight module. Further, two ends of the light shielding film are respectively and fixedly mounted, through adhesive bonding, to the backplane and the light guide plate, whereby the structure is simple and the cost is low. Further, a light shielding section of the light shielding film is arranged to be extendable so as to effectively prevent shifting of the light shielding film resulting from an external force acting thereon during the transportation thereof thereby further effectively preventing the occurrence of light leaking and being helpful for bezel slimming of the liquid crystal display device.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 5:
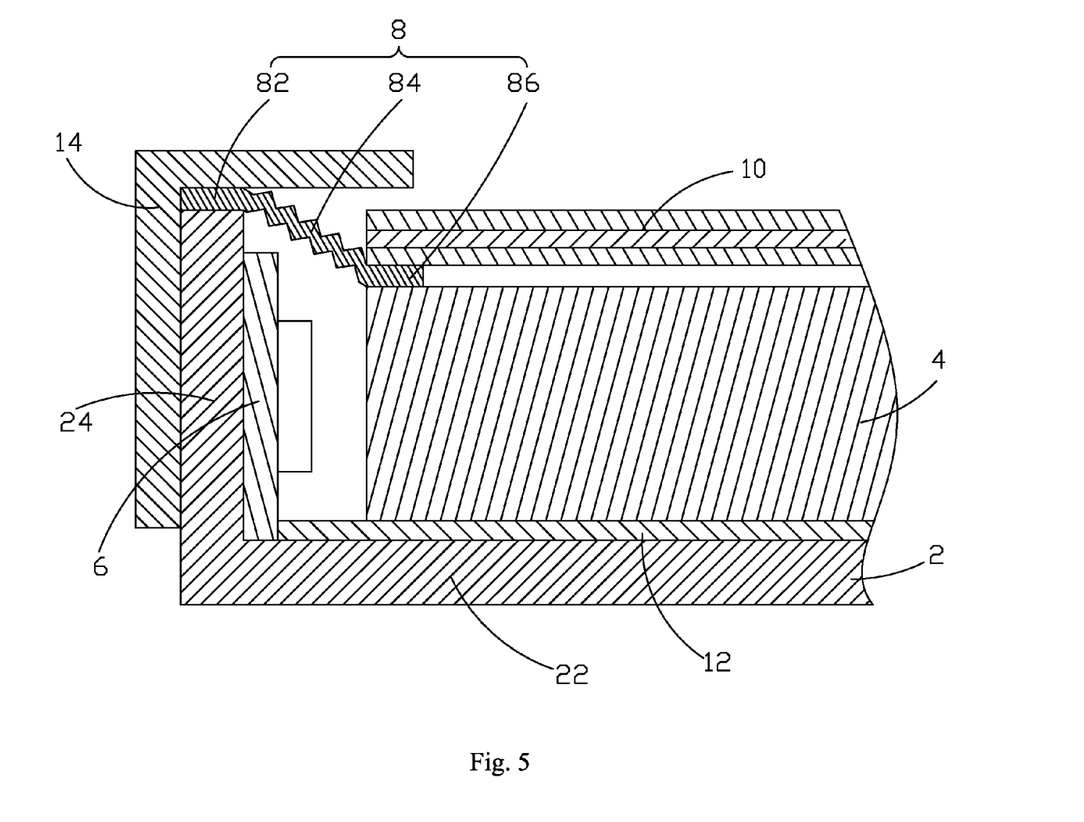
FIG. 5 is a cross-sectional view showing a structure of a backlight module according to the present invention.

Referring to FIG. 5, the present invention provides a backlight module, which comprises: a backplane 2, a light guide plate 4 arranged in the backplane 2, a backlight source 6 arranged in the backplane 2 at one side of the light guide plate 4, a light shielding film 8 mounted on the light guide plate 4 and the backplane 2 and located above the backlight source 6, an optic film assembly 10 arranged on the light shielding film 8 and the light guide plate 4, a bottom reflector plate 12 arranged between the backplane 2 and the light guide plate 4, and a mold frame 14 mounted on the backplane 2. The light shielding film 8 has an end fixedly connected to an upper surface of the light guide plate 4 and an opposite end fixedly connected to the backplane 2. With the arrangement of the light shielding film 8, light emitting from the backlight source 6 is not allowed to get directly incident to the optic film assembly 10, thereby avoiding occurrence of light leaking.

Specifically, the backplane 2 comprises a bottom board 22 and a side board 24 perpendicularly connected to the bottom board 22. The backlight source 6 is fixedly mounted to the side board 24. The opposite end of the light shielding film 8 is fixedly connected to the side board 24 of the backplane 2.

Further, the light shielding film 8 comprises a first connection section 82, a light shielding section 84 connected to the first connection section 82, and a second connection section 86 connected to the light shielding section 84. The first connection section 82 is fixedly connected to an upper end of the side board 24 of the backplane 2. The light shielding section 84 is located exactly above the backlight source 6. The second connection section 86 is fixedly connected to the upper surface of the light guide plate 4. In the instant embodiment, the first connection section 82 is fixedly connected to the upper end of the side board 24 of the backplane 2 through adhesive bonding; and the second connection section 86 is fixedly connected to the upper surface of the light guide plate 4 through adhesive bonding. The first connection section 82 is located between the mold frame 14 and the upper end of the side board 24 of the backplane 2.

The light shielding section 84 is arranged to be extendable and preferably, the light shielding section 84 is made in the form of a folded configuration, in order to prevent shifting of the light shielding film 8 resulting from an external force acting thereon during the transportation thereof, thereby effectively preventing the occurrence of light leaking.

Figure 6:
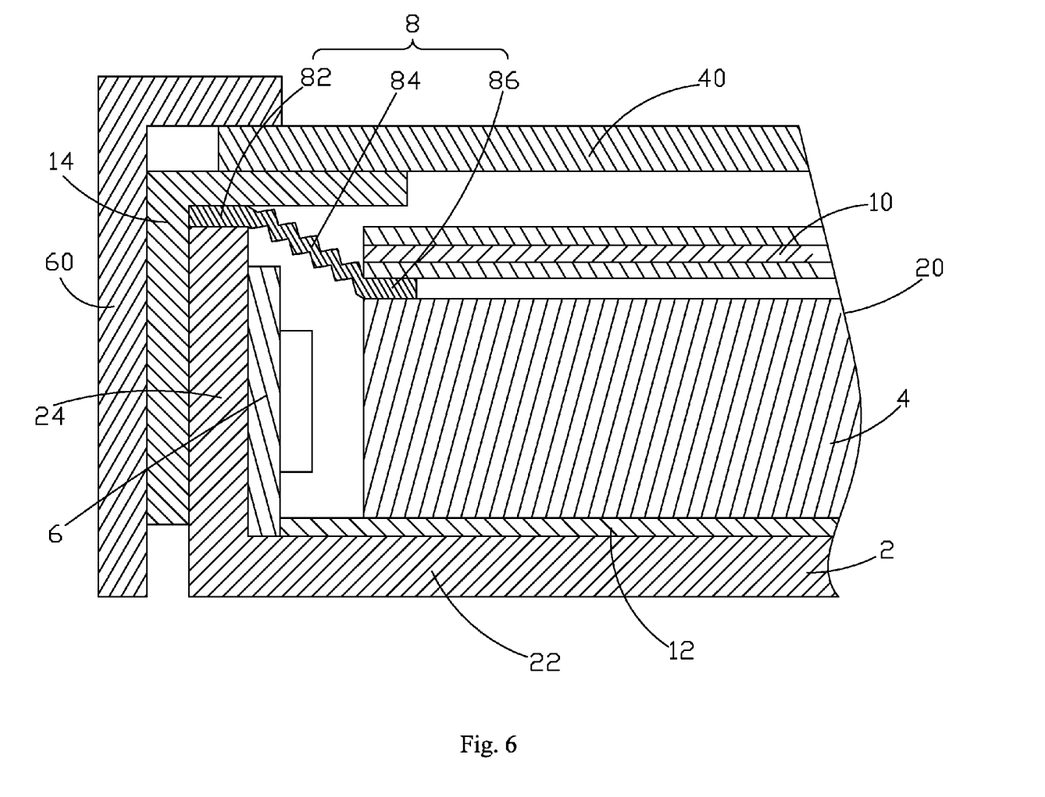
FIG. 6 is a cross-sectional view showing a structure of a liquid crystal display device according to the present invention.

Referring to FIG. 6, the present invention further provides a liquid crystal display device, which comprises: a backlight module 20, a liquid crystal display panel 40 arranged on the backlight module 20, and a bezel 60 arranged on the liquid crystal display panel 40. The backlight module comprises a backplane 2, a light guide plate 4 arranged in the backplane 2, a backlight source 6 arranged in the backplane 2 at one side of the light guide plate 4, a light shielding film 8 mounted on the light guide plate 4 and the backplane 2 and located above the backlight source 6, an optic film assembly 10 arranged on the light shielding film 8 and the light guide plate 4, a bottom reflector plate 12 arranged between the backplane 2 and the light guide plate 4, and a mold frame 14 mounted on the backplane 2. The light shielding film 8 has an end fixedly connected to an upper surface of the light guide plate 4 and an opposite end fixedly connected to the backplane 2. With the arrangement of the light shielding film 8, light emitting from the backlight source 6 is not allowed to get directly incident to the optic film assembly 10, thereby avoiding occurrence of light leaking.

Specifically, the backplane 2 comprises a bottom board 22 and a side board 24 perpendicularly connected to the bottom board 22. The backlight source 6 is fixedly mounted to the side board 24. The opposite end of the light shielding film 8 is fixedly connected to the side board 24 of the backplane 2.

Further, the light shielding film 8 comprises a first connection section 82, a light shielding section 84 connected to the first connection section 82, and a second connection section 86 connected to the light shielding section 84. The first connection section 82 is fixedly connected to an upper end of the side board 24 of the backplane 2. The light shielding section 84 is located exactly above the backlight source 6. The second connection section 86 is fixedly connected to the upper surface of the light guide plate 4. In the instant embodiment, the first connection section 82 is fixedly connected to the upper end of the side board 24 of the backplane 2 through adhesive bonding; and the second connection section 86 is fixedly connected to the upper surface of the light guide plate 4 through adhesive bonding. The first connection section 82 is located between the mold frame 14 and the upper end of the side board 24 of the backplane 2.

The light shielding section 84 is arranged to be extendable and preferably, the light shielding section 84 is made in the form of a folded configuration, in order to prevent shifting of the light shielding film 8 resulting from an external force acting thereon during the transportation thereof, thereby effectively preventing the occurrence of light leaking.

In summary, the present invention provides a backlight module and a liquid crystal display device using the backlight module, in which a light shielding film arranged above the backlight source to effectively prevent light leaking and enhance the optical quality of the backlight module. Further, two ends of the light shielding film are respectively and fixedly mounted, through adhesive bonding, to the backplane and the light guide plate, whereby the structure is simple and the cost is low. Further, a light shielding section of the light shielding film is arranged to be extendable so as to effectively prevent shifting of the light shielding film resulting from an external force acting thereon during the transportation thereof thereby further effectively preventing the occurrence of light leaking and being helpful for bezel slimming of the liquid crystal display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane, a light guide plate arranged in the backplane, a backlight source arranged in the backplane at one side of the light guide plate, a light shielding film mounted on the light guide plate and the backplane and located above the backlight source, and an optic film assembly arranged on the light shielding film and the light guide plate, the light shielding film having one end fixedly connected to an upper surface of the light guide plate and an opposite end fixedly connected to the backplane;

wherein the light shielding member comprises a light shielding section that is extendable and located between the upper surface of the light guide plate and the backplane and located above the backlight source.

2. The backlight module as claimed in claim 1, wherein the backplane comprises a bottom board and a side board perpendicularly connected to the bottom board, the backlight source being fixedly mounted to the side board, the opposite end of the light shielding film being fixedly connected to the side board of the backplane.

3. The backlight module as claimed in claim 2, wherein the light shielding film comprises a first connection section and a second connection section, the light shielding section being connected between the first connection section and the second connection section, the first connection section being fixedly connected to an upper end of the side board of the backplane, the second connection section being fixedly connected to the upper surface of the light guide plate.

4. The backlight module as claimed in claim 3, wherein the first connection section is fixedly connected to the upper end of the side board of the backplane through adhesive bonding and the second connection section is fixedly connected to the upper surface of the light guide plate through adhesive bonding.

5. The backlight module as claimed in claim 1, wherein the light shielding section is in the form of a folded configuration.

6. The backlight module as claimed in claim 4 further comprising a bottom reflector plate arranged between the backplane and the light guide plate and a mold frame mounted on the backplane, the first connection section being located between the mold frame and the upper end of the side board of the backplane.

7. A backlight module, comprising: a backplane, a light guide plate arranged in the backplane, a backlight source arranged in the backplane at one side of the light guide plate, a light shielding film mounted on the light guide plate and the backplane and located above the backlight source, and an optic film assembly arranged on the light shielding film and the light guide plate, the light shielding film having one end fixedly connected to an upper surface of the light guide plate and an opposite end fixedly connected to the backplane;

wherein the backplane comprises a bottom board and a side board perpendicularly connected to the bottom board, the backlight source being fixedly mounted to the side board, the opposite end of the light shielding film being fixedly connected to the side board of the backplane;

wherein the light shielding film comprises a first connection section, a light shielding section connected to the first connection section, and a second connection section connected to the light shielding section, the first connection section being fixedly connected to an upper end of the side board of the backplane, the light shielding section being located above the backlight source, the second connection section being fixedly connected to the upper surface of the light guide plate; and     wherein the light shielding section is extendable.

8. The backlight module as claimed in claim 7, wherein the first connection section is fixedly connected to the upper end of the side board of the backplane through adhesive bonding and the second connection section is fixedly connected to the upper surface of the light guide plate through adhesive bonding.

9. The backlight module as claimed in claim 7, wherein the light shielding section is in the form of a folded configuration.

10. The backlight module as claimed in claim 8 further comprising a bottom reflector plate arranged between the backplane and the light guide plate and a mold frame mounted on the backplane, the first connection section being located between the mold frame and the upper end of the side board of the backplane.

11. A liquid crystal display device, comprising: a backlight module, a liquid crystal display panel arranged on the backlight module, and a bezel arranged on the liquid crystal display panel, the backlight module comprising a backplane, a light guide plate arranged in the backplane, a backlight source arranged in the backplane at one side of the light guide plate, a light shielding film mounted on the light guide plate and the backplane and located above the backlight source, and an optic film assembly arranged on the light shielding film and the light guide plate, the light shielding film having one end fixedly connected to an upper surface of the light guide plate and an opposite end fixedly connected to the backplane;

wherein the light shielding member comprises a light shielding section that is extendable and located between the upper surface of the light guide plate and the backplane and located above the backlight source.

12. The liquid crystal display device as claimed in claim 11, wherein the backplane comprises a bottom board and a side board perpendicularly connected to the bottom board, the backlight source being fixedly mounted to the side board, the light shielding film comprising a first connection section and a second connection section, connected to the light shielding section being connected between the first connection section and the second connection section, the first connection section being fixedly connected to an upper end of the side board of the backplane through adhesive bonding, the light shielding section being made in the form of a folded configuration arranged above the backlight source, the second connection section being fixedly connected to the upper surface of the light guide plate through adhesive bonding.

13. The liquid crystal display device as claimed in claim 12, wherein the backlight module further comprises a bottom reflector plate arranged between the backplane and the light guide plate and a mold frame mounted on the backplane, the first connection section being located between the mold frame and the upper end of the side board of the backplane.

\* \* \* \* \*